United States Patent
Vangal et al.

(10) Patent No.: US 10,739,804 B2
(45) Date of Patent: Aug. 11, 2020

(54) VOLTAGE REGULATOR EFFICIENCY-AWARE GLOBAL-MINIMUM ENERGY TRACKING

(71) Applicant: Intel Corporation, Santa Clara, CA (US)

(72) Inventors: Sriram R. Vangal, Portland, OR (US); Turbo Majumder, Portland, OR (US); Vivek De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/712,813

(22) Filed: Sep. 22, 2017

(65) Prior Publication Data

US 2019/0094897 A1    Mar. 28, 2019

(51) Int. Cl.
| | |
|---|---|
| *G05F 1/66* | (2006.01) |
| *G05F 1/46* | (2006.01) |
| *G06F 1/3296* | (2019.01) |
| *H02M 3/158* | (2006.01) |
| *H02M 1/08* | (2006.01) |
| *H02M 3/157* | (2006.01) |

(52) U.S. Cl.
CPC .............. *G05F 1/66* (2013.01); *G05F 1/462* (2013.01); *G06F 1/3296* (2013.01); *H02M 1/08* (2013.01); *H02M 3/157* (2013.01); *H02M 3/158* (2013.01)

(58) Field of Classification Search
CPC ........ H02M 3/157; H02M 3/158; H02M 1/08; H02M 2001/0025; G05F 1/575
See application file for complete search history.

(56) References Cited

U.S. PATENT DOCUMENTS

| | | | |
|---|---|---|---|
| 8,346,315 B2 * | 1/2013 | Lindoff | H04W 48/18 455/574 |
| 2007/0182391 A1 | 8/2007 | Chapuis et al. | |
| 2009/0008997 A1 | 1/2009 | Redford et al. | |
| 2010/0261083 A1 * | 10/2010 | Yanase | H01M 8/04552 429/432 |
| 2012/0159216 A1 | 6/2012 | Wells et al. | |

(Continued)

OTHER PUBLICATIONS

"Minimum Energy Tracking Loop With Embedded DC-DC-Converter Enabling Ultra-Low-Voltage Operation Down to 250 mV in 65 nn CMOS," Ramadass, et al, IEEE Journal of Solid-State Circuits, vol. 43, No. 1, Jan. 2008, pp. 256-265.

(Continued)

*Primary Examiner* — Jeffrey A Gblende
*Assistant Examiner* — Lakaisha Jackson
(74) *Attorney, Agent, or Firm* — Patent Capital Group

(57) ABSTRACT

Various embodiments of the invention may be used to find a combination of voltage and frequency that results in a minimum amount of energy consumption in a digital system, including energy consumed by the system's voltage regulator (VR). The process may involve finding a separate point of minimum energy consumption for each of several different modes of the VR, where a mode is the ratio of Vin to Vout for that VR. The smallest value of those points may then be selected as the overall minimum. The process for making this determination may be performed in situ while the device is in operation, and may encompass changes in operational temperature, load, and process variations.

19 Claims, 3 Drawing Sheets

(56) References Cited

U.S. PATENT DOCUMENTS

2013/0320946 A1* 12/2013 Luo .................. H02M 3/158
323/283
2015/0069857 A1    3/2015  Diewald et al.
2017/0083033 A1    3/2017  Park et al.
2017/0093270 A1*   3/2017  Matthew ............... H02M 3/156

OTHER PUBLICATIONS

A 0.45-1 V Fully-Integrated Distributed Switched Capacitor DC-DC Converter with High Density MIM Capacitor in 22nm Tri-Gate CMOS, IEEE Journal of Solid-State Circuits, vol. 49, No. 4, Apr. 2014, pp. 917-927.
International Search Report and Written Opinion in International Patent Application No. PCT/US2018/049153 dated Dec. 24, 2018, 9 pages.

\* cited by examiner

VOLTAGE REGULATOR EFFICIENCY-AWARE GLOBAL-MINIMUM ENERGY TRACKING

TECHNICAL FIELD OF THE INVENTION

Various embodiments of the invention relate to controlling power to digital integrated circuits with an intention of achieving minimal energy consumption under various conditions.

BACKGROUND

Energy consumption in most digital integrated circuits is highly dependent on the supply voltage that powers the integrated circuits and on the frequency of the clock that controls the switching of the integrated circuits. Today's integrated circuits are able to operate over a wide dynamic range of both supply voltage and frequency, which can result in a widely varying range of energy efficiencies. In particular, the best energy efficiencies in digital CMOS silicon may be achieved around the "near-threshold voltage" (NTV) regime with an optimum supply voltage and frequency and a distinct minimum-energy point (MEP), where energy efficiencies can be 5-10× better than nominal supply operation. A key observation is that the optimum voltage and MEP can vary widely across workload activity and with process and temperature variations. Non-linear integrated voltage regulator (IVR) efficiencies can further shift MEP and optimum voltage, as the energy consumed by the entire system is taken into account. Finding a truly optimal MEP can make a significant difference in the energy consumed by the system.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
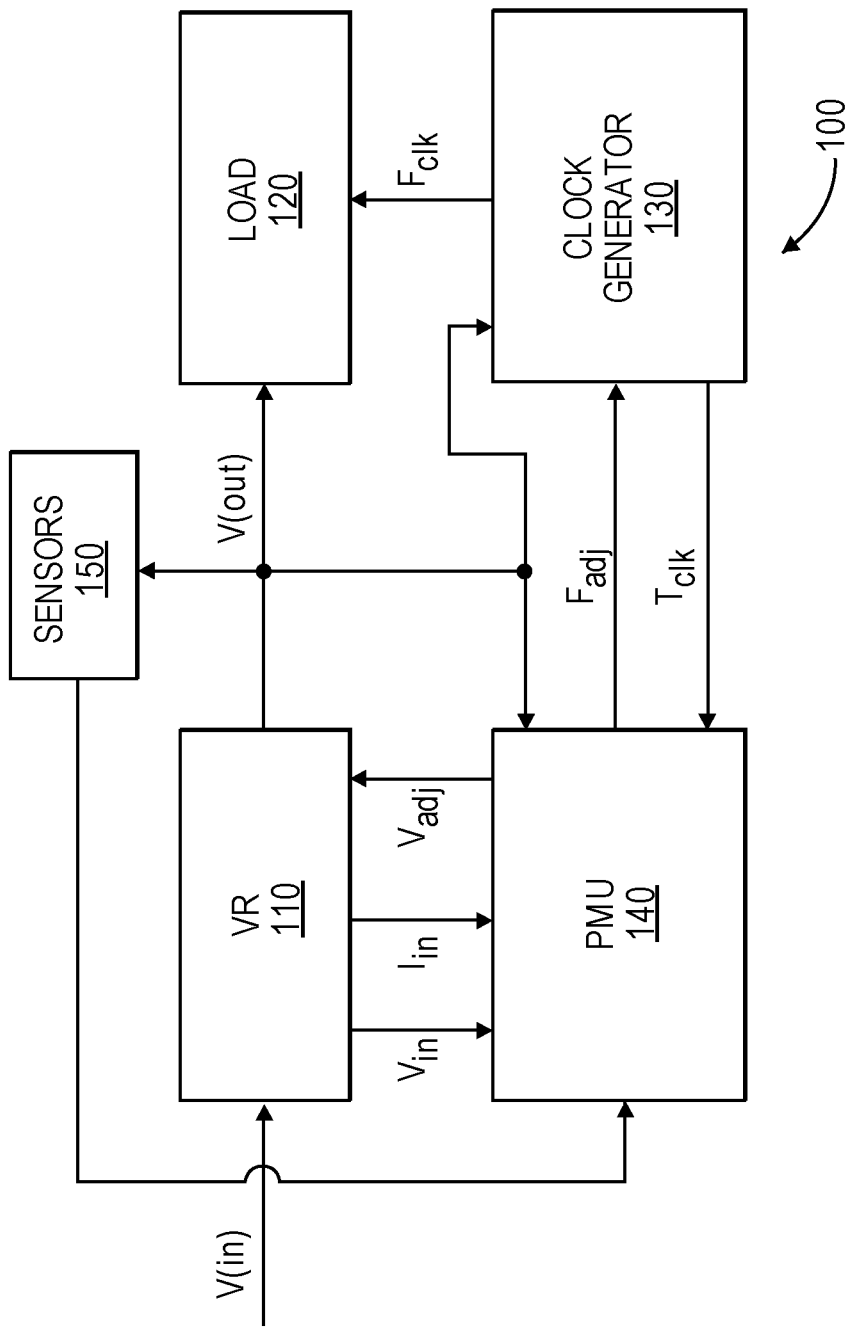
FIG. 1 shows a diagram of an energy management device, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented fully or partially in software and/or firmware. This software and/or firmware may take the form of instructions contained in or on a non-transitory computer-readable storage medium. The instructions may be read and executed by one or more processors to enable performance of the operations described herein. The medium may be internal or external to the device containing the processor(s), and may be internal or external to the device performing the operations. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Various embodiments may track the true MEP that takes into account local and global MEP points that result from the use of a voltage regulator with a non-monotonic efficiency response. Within this document, a non-monotonic efficiency response means the system may have multiple peaks/valleys) for various conversion modes. A switched-capacitor voltage regulator (SCVR) may be an example of such a VR. Knowledge and in-situ tracking of the global MEP across workloads and in the presence of process variations may reduce V guard bands and maximize energy efficiency.

FIG. 1 shows a block diagram of an energy management system, according to an embodiment of the invention. A voltage regulator (VR) 110 may receive an input voltage V(in) and convert it to a variable output voltage V(out), which may be used to provide energy to load 120. In some embodiments it may also be used to provide energy to energy management unit (PMU) 140 and/or Clock Generator 130 and/or Sensors 150. When connected in this manner, these components may also be included in determining the minimum energy consumption for the system. Within this document, the parentheses used in the terms 'V(in)' and 'V(out) indicates that these are analog voltage values. The remaining signal terms in FIG. 1 (without such parentheses) may be digital values, suitable for processing by digital circuitry. In some embodiments, the blocks 110, 120, 130, 140, and 150 of FIG. 1 may be considered functional blocks rather than physical blocks, and their circuitry may be integrated together.

In some embodiments the VR may be a switched capacitor voltage regulator (SCVR), but other embodiments may use other types of VRs, such as but not limited to inductor based buck or linear drop-out (LDO) implementations. V(in) may come from any suitable source, such as but not limited to a battery, an AC-DC energy supply, a DC-DC converter, etc. The voltage level of V(out) may be adjusted as needed in an attempt to reduce overall energy consumption. Clock generator 130 may produce a clock signal $F_{clk}$ with a variable frequency to operate the digital circuitry in the load 120.

The PMU 140 is shown getting an input Vin from the VR, an input $I_{in}$ from the VR representing the digital value of I(in), where I(in) is the input current to the VR corresponding to V(in), and an input $T_{clk}$ from the Clock Generator. These values may be used to determine the energy per operation ($E_{op}$) being consumed by the system according to formula (1):

$$E_{op}=V_{in}*I_{in\_avg}*T_{clk}. \qquad (1)$$

where $V_{in}$ may represent the digital value of V(in), $I_{in\_avg}$ may represent the digital value of the average current into the VR over multiple operations, and $T_{clk}$ may represent the time period of an operation. Within the context of this document, an 'operation' may be defined as a clock cycle corresponding to frequency $F_{clk}$, or a pre-defined number of such clock cycles, typically the number it takes to complete a unit of task, or another defined period of time that is consistent throughout the process of FIG. 2. Values for $V_{in}$, $I_{in\_avg}$, and $T_{clk}$ may all be in digital format so that formula (1) may be computed digitally.

Because $V_{in}$ and $I_{in}$ represent power into the VR, formula (1) may automatically include energy consumed by the VR itself plus energy consumed by any components powered by the VR. Thus any changes in the VR's efficiency may be automatically accounted for when seeking minimum energy consumption for the system.

Based on the energy per operation, power may be adjusted by sending a $V_{adj}$ signal to the VR to change V(out) and/or sending a $F_{adj}$ signal to the Clock Generator to adjust the clock frequency. In this way, energy consumption may be incrementally changed by adjusting voltage and/or frequency. And this change in energy consumption may, in turn, be examined to determine if these changes are increasing or decreasing overall energy consumption, based on formula (1).

Sensors 150 may include logic used to measure voltage, current, frequency, etc., as well as taking other measurements that may not be directly related to controlling energy consumption, and may provide these measurements to the PMU. One example is to measure when V(out) has dropped below an acceptable level and send a signal to the PMU to adjust its tracking method. Another example is to sense an on-die temperature sensor, which may trigger the PMU to re-scan and re-lock to a new $V_{opt}$ value. These sensors may be coupled to the other components in ways not shown. In some embodiments, all the components shown in FIG. 1 may be integrated into a single semiconductor die, without the need for additional external components.

Figure 2:
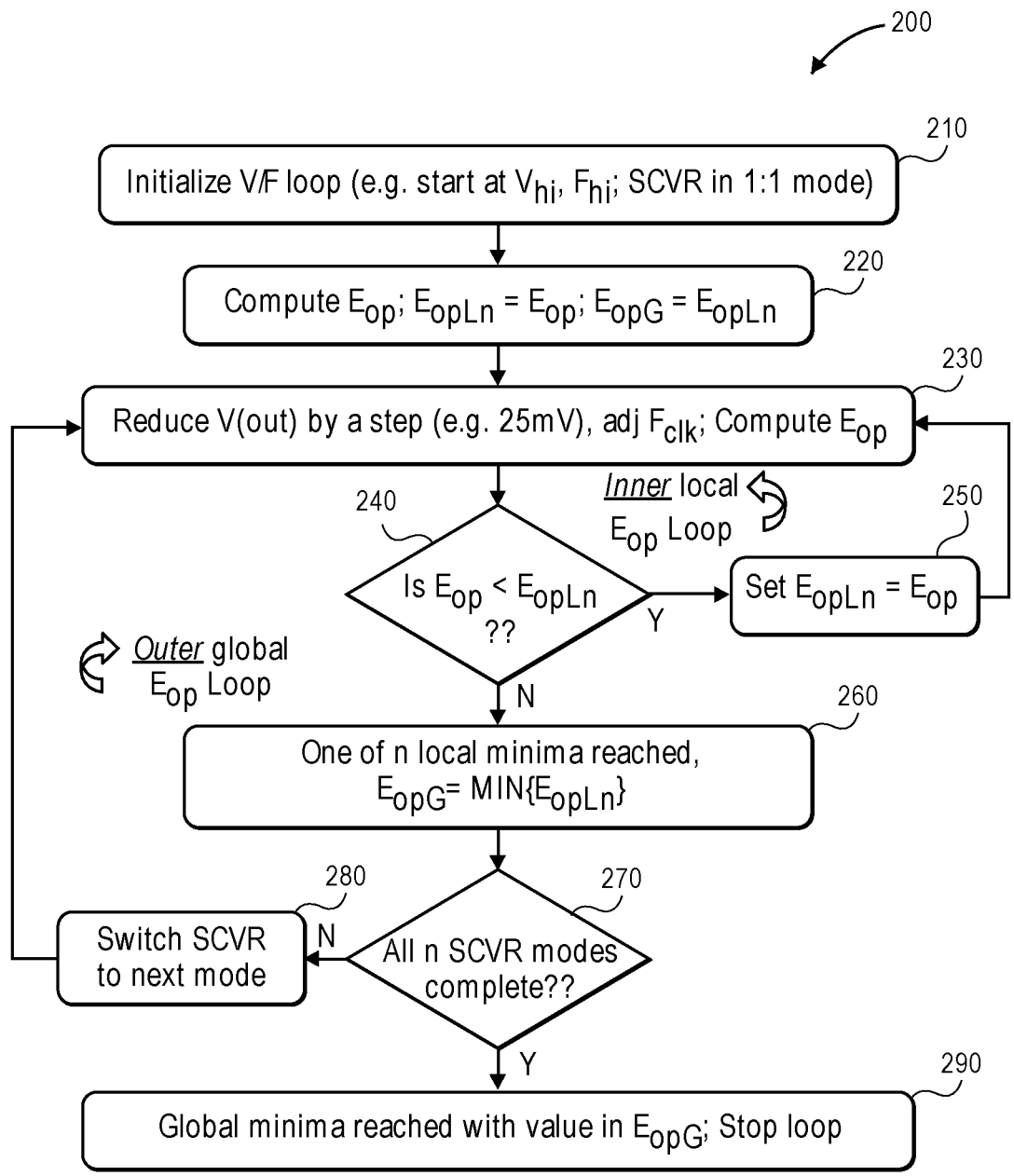
FIG. 2 shows a flow diagram of a method of determining a minimum energy point, according to an embodiment of the invention.

FIG. 2 shows a flow diagram of a method of determining a minimum energy consumption point in a system, according to an embodiment of the invention. In some embodiments, the method of this flow diagram may be performed by the PMU 140 of FIG. 1, while in some embodiments the method may be performed by one or more processors in load 120. In some embodiments the method may be executed by performing dual loops, labeled in FIG. 2 as an inner local loop and an outer global loop. In the illustrated example, to begin method 200 the PMU may be initialized at 210 by setting $V_{out}$ and $F_{clk}$ to their highest values $V_{hi}$ and $F_{hi}$, and the VR may be set to a specific mode, such as the 1:1 mode. Note: in the embodiment described below, V(out) may start at a high value, and be decremented with each pass through the local loop. In other embodiments, V(out) may start at a low value, and be incremented with each pass through the local loop. In the incrementing embodiment, the '<' symbol in block 240 may also be changed to a '>' symbol.

For the purposes of this document, the 'mode' of a VR refers to the ratio of V(in) to V(out). For example, in a 3:2 mode, V(in)/V(out) would equal 3/2. In the various embodiments of the invention, small changes in V(out) may be made to adjust overall energy consumption by the system, but these may be small compared to the overall V(out), and do not change the 'mode' designation in effect at the time.

From 220 onward, two additional versions of $E_{op}$ are defined. $E_{opLn}$ is an intermediate value of $E_{op}$ that is used to find a local minimum for the mode n that is in effect at the time. EopG is a value that is used to find a global minimum based on finding multiple local minimums for $E_{opLn}$, each for a different mode. In operation 220, both $E_{opLn}$ and EopG are initialized to $E_{op}$ as $E_{op}$ is calculated in formula (1). At 230, V(out) may be reduced by decrementing it by a defined amount. Operation 230 shows decrementing it by 25 mV, but other amounts may also be used. Referring back to FIG. 1, this change may be triggered by $V_{adj}$ from the PMU to the VR 110, which may in turn cause V(out) from the VR to change. $F_{clk}$ may also be adjusted, triggered by signal $F_{adj}$ from the PMU to clock generator 130. These changes to V(out) and $F_{clk}$ may change the energy consumed, and based on the corresponding new values of $V_{out}$ and $F_{clk}$, a new value of $E_{op}$ may be computed at 230. In some embodiments, there is a predetermined relationship between V(out) and $F_{clk}$, so that any time V(out) is changed, $F_{clk}$ will be changed as well, possibly through a look-up table.

This new value of $E_{op}$ may be compared with the $E_{opLn}$ at 240. If the new $E_{op}$ is now less than $E_{opLn}$ as determined at 240, then $E_{opLn}$ may be set equal to that new $E_{op}$ at 250. Then flow may move again to 230, where V(out) and $F_{clk}$ may again be incrementally changed and a new value of $E_{op}$ computed. This completes the inner local loop of 230-240-250. Note: V(out) may be changed by the signal $V_{adj}$ from the PMU, which instructs the VR to change its output voltage V(out).

Inner loop 230-240-250 may be repeated until $E_{op}$ reaches a minimum point, as indicated by $E_{op}$ being greater than or equal to $E_{opLn}$ at 240. This minimum point may then be recorded for subsequent reference. It is expected that multiple passes through the inner loop will be repeated later for other modes of the VR, to obtain multiple minimum values, one for each mode.

After obtaining a minimum value for $E_{opLn}$, $E_{opG}$ for the present VR mode may be set to that value at 260. If previous VR modes have already been examined, then $E_{opG}$ may be set at 260 to the smallest of those minimum values among all the modes thus far examined. In this way, global minimum $E_{opG}$ may be repeatedly set to the smallest local minimum as each VR mode is successively examined.

If there are other VR modes remaining to be examined, as determined at 270, then PMU 140 may cause the VR to switch to the next mode at 280, and the flow may return to 230, where inner loop 230-240-250 may be repeated for that mode. Flow may continue repeatedly through 230-280 until all modes have been examined, as determined at 270. At that point, $E_{opG}$ should represent the smallest of all the $E_{opLn}$'s for all the modes, and therefore be the point of least energy consumption for the global system. Flow diagram 200 may therefore stop at 290. Because of the operations taken at 230, the voltage and frequency in the actual circuit should already be at the correct point to result in this minimum energy consumption.

In some embodiments, flow diagram 200 may be repeated from time to time. This repetition may be based on various factors, including but not limited to such things as: 1) immediately after determination of the latest $E_{opG}$, 2) a pre-determined schedule, 3) detected changes in environmental factors, 4) power-up of the circuitry, 5) etc.

Figure 3:
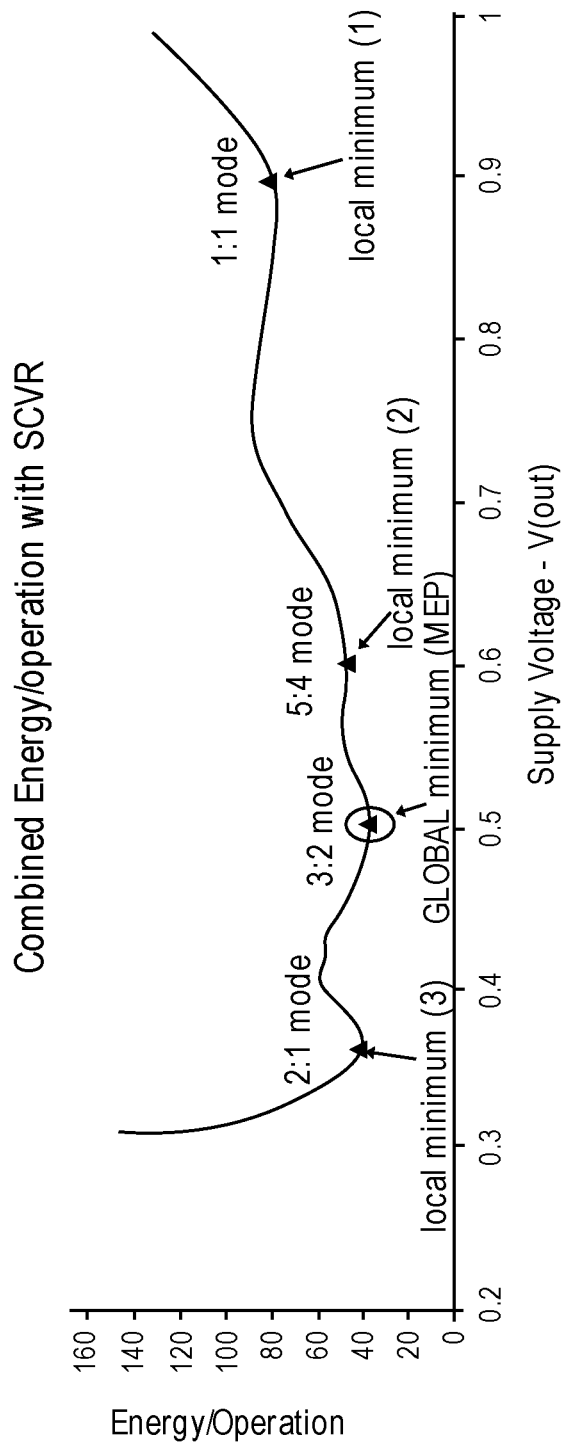
FIG. 3 shows a chart of energy consumed per operation over a range of voltages, according to an embodiment of the invention.

FIG. 3 shows a chart of energy consumed per operation over a range of voltages, according to an embodiment of the invention. This might be the results produced by following the flow diagram of FIG. 2 for a particular circuit. In this example, four modes of the VR were charted (1:1, 5:4, 3:2, and 2:1), each producing its own local minimum. One of these four (the 3:2 mode) produced a local minimum that was smaller than the others, and this one therefore became the Global minimum. Referring to FIG. 2, this would be the $E_{opG}$ of operation 290.

The functions and operations described in this document may be performed in various parts of the system. For example, in some embodiments the calculations of FIG. 2 may be performed in one or more processors that are in the load 120 in FIG. 1, while the PMU 140 merely sends control signals derived by the processor(s). In other embodiments, PMU 140 may perform all the calculations. In still other embodiments, this functionality may be shared between the processor(s) in load 120 and the PMU 140. In some embodiments, PMU 140 and Clock Generator 130 may be powered by V(out), and their energy consumption therefore included in the calculation of formula (1). This is the configuration indicated in FIG. 1. In other embodiments, PMU 140 and/or Clock Generator 130 may not be powered by V(out), and their energy consumption would not be included in the calculation, which might lead to a less-than-optimum result for minimizing energy consumption.

EXAMPLES

The following examples pertain to particular embodiments:

Example 1 includes a device for controlling energy consumption, the device comprising a voltage regulator (VR) having multiple modes to energize a load, wherein a mode is a ratio of input voltage to output voltage for the VR, a clock generator to generate multiple frequencies to operate the load a power management unit (PMU) to control operation of the VR and the clock generator and the load; wherein the device is configured to determine a separate point of minimum energy consumption for each of the multiple modes; select a one of the separate points as a point of minimum energy consumption for the device; and set the output voltage and frequency of the device to values defining the selected point.

Example 2 includes the device of example 1, wherein the voltage regulator is to have a non-monotonic efficiency response.

Example 3 includes the device of example 2, wherein the voltage regulator is to be a switched capacitor voltage regulator.

Example 4 includes the device of example 1, wherein said determining a separate point of minimum energy consumption for a mode comprises incrementally reducing the output voltage of the voltage regulator and recalculating energy consumption after each reduction until the point of minimum energy consumption is found.

Example 5 includes the device of example 1, wherein said determining a separate point of minimum energy consumption for a mode comprises incrementally increasing the output voltage of the voltage regulator and recalculating energy consumption after each increase until the point of minimum energy consumption is found.

Example 6 includes the device of example 1, wherein said selecting a one of the separate points as a point of minimum energy consumption comprises selecting a point of minimum energy consumption having a smallest value among all the modes.

Example 7 includes the device of example 1, wherein each separate point of minimum energy consumption is to be calculated as Eop=input voltage to the VR*average current into the VR over multiple operations*a defined time period.

Example 8 includes the device of example 1, further comprising one or more sensors coupled to the power management unit.

Example 9 includes a method of regulating energy consumption in a device, comprising: determining a separate point of minimum energy consumption for each of multiple modes of a voltage regulator, wherein a mode is a ratio of voltage output to voltage input of the voltage regulator; selecting a one of the separate points as a point of minimum energy consumption for the device; and setting the output voltage and frequency of the device to values defining the selected point.

Example 10 includes the method of example 9, wherein the voltage regulator has a non-monotonic efficiency response.

Example 11 includes the method of example 9, wherein said determining a separate point of minimum energy consumption for a mode comprises incrementally reducing the output voltage of the voltage regulator and recalculating energy consumption after each reduction until the point of minimum energy consumption is found.

Example 12 includes the method of example 9, wherein said determining a separate point of minimum energy consumption for a mode comprises incrementally increasing the output voltage of the voltage regulator and recalculating energy consumption after each increase until the point of minimum energy consumption is found.

Example 13 includes the method of example 9, wherein said selecting a one of the separate points as a point of minimum energy consumption comprises selecting a point of minimum energy consumption having a smallest value among all the modes.

Example 14 includes the method of example 9, wherein said determining a minimum point of minimum energy consumption is calculated as Eop=input voltage to the VR*average current into the VR over multiple operations*a defined time period.

Example 15 includes a computer-readable non-transitory storage medium that contains instructions, which when executed by one or more processors result in performing operations comprising: determining a separate point of minimum energy consumption for each of multiple modes of a voltage regulator, wherein a mode is a ratio of an input voltage of the voltage regulator to an output voltage of the voltage regulator; selecting a one of the separate points as a point of minimum energy consumption for a device; and setting the output voltage and frequency of the device to values defining the selected point.

Example 16 includes the medium of example 15, wherein the voltage regulator has a non-monotonic efficiency response.

Example 17 includes the medium of example 15, wherein the operation of determining a separate point of minimum energy consumption for a mode comprises incrementally reducing the output voltage of the voltage regulator and recalculating energy consumption after each reduction until the point of minimum energy consumption is found.

Example 18 includes the medium of example 15, wherein the operation of determining a separate point of minimum energy consumption for a mode comprises incrementally increasing the output voltage of the voltage regulator and recalculating energy consumption after each increase until the point of minimum energy consumption is found.

Example 19 includes the medium of example 15, wherein the operation of selecting a one of the separate points as a point of minimum energy consumption comprises selecting a point of minimum energy consumption having a smallest value among all the modes.

Example 20 includes the medium of example 15, wherein each separate point of minimum energy consumption is to be calculated as Eop=input voltage to the VR*average current into the VR over multiple operations*a defined time period.

The foregoing description is intended to be illustrative and not limiting. Variations will occur to those of skill in the art. Those variations are intended to be included in the various embodiments of the invention, which are limited only by the scope of the following claims.

What is claimed is:

1. A device for controlling energy consumption, the device comprising:
    a switched-capacitor voltage regulator (VR) that receives an input voltage and converts the input voltage to an output voltage, the VR having multiple modes to energize a load, wherein a mode is a ratio of the input voltage to the output voltage for the VR;
    a clock generator to generate a clock signal with a frequency and to generate multiple frequencies to operate the load;
    a power management unit (PMU) to control operation of the VR and the clock generator; and
    the load;
    wherein the device is configured to:
        adjust the output voltage and the frequency of the clock signal to determine a separate point of minimum energy consumption for each of the multiple modes;
        select one of the separate points as a point of minimum energy consumption for the device; and
        set the output voltage and frequency of the device to values defining the selected separate point.

2. The device of claim 1, wherein the voltage regulator is to have a non-monotonic efficiency response.

3. The device of claim 1, wherein said determining the separate point of minimum energy consumption comprises incrementally reducing the output voltage of the voltage regulator and recalculating energy consumption after each reduction until the point of minimum energy consumption is found.

4. The device of claim 1, wherein said determining the separate point of minimum energy consumption comprises incrementally increasing the output voltage of the voltage regulator and recalculating energy consumption after each increase until the point of minimum energy consumption is found.

5. The device of claim 1, wherein said selecting one of the separate points as a point of minimum energy consumption comprises selecting the point of minimum energy consumption having a smallest value among all the multiple modes.

6. The device of claim 1, wherein each separate point of minimum energy consumption is to be calculated as Eop=input voltage to the VR*average current into the VR over multiple operations*a defined time period.

7. The device of claim 1, further comprising
    one or more sensors coupled to the power management unit.

8. A method of regulating energy consumption in a device, comprising:
    generating a clock signal with a frequency;
    adjusting an output voltage and the frequency of the clock signal for determining a separate point of minimum energy consumption for each of multiple modes of a switched-capacitor voltage regulator (VR), wherein the VR receives an input voltage and converts the input voltage to the output voltage, and a mode is a ratio of the voltage output to the voltage input of the voltage regulator;
    selecting one of the separate points as a point of minimum energy consumption for the device; and
    setting the output voltage and frequency of the device to values defining the selected separate point.

9. The method of claim 8, wherein the voltage regulator has a non-monotonic efficiency response.

10. The method of claim 8, wherein said determining the separate point of minimum energy consumption comprises incrementally reducing the output voltage of the voltage regulator and recalculating energy consumption after each reduction until the point of minimum energy consumption is found.

11. The method of claim 8, wherein said determining the separate point of minimum energy consumption comprises incrementally increasing the output voltage of the voltage regulator and recalculating energy consumption after each increase until the point of minimum energy consumption is found.

12. The method of claim 8, wherein said selecting one of the separate points as the point of minimum energy consumption comprises selecting a point of minimum energy consumption having a smallest value among all the modes.

13. The method of claim 8, wherein said determining the point of minimum energy consumption is calculated as Eop=input voltage to the VR*average current into the VR over multiple operations*a defined time period.

14. A computer-readable, non-transitory storage medium that contains instructions, which when executed by one or more processors, result in performing operations comprising:
    generating a clock signal with a frequency;
    adjusting an output voltage and the frequency of the clock signal for determining a separate point of minimum energy consumption for each of multiple modes of a switched-capacitor voltage regulator (VR), wherein the VR receives an input voltage and converts the input voltage to the output voltage, and a mode is a ratio of the input voltage of the voltage regulator to the output voltage of the voltage regulator;
    selecting one of the separate points as a point of minimum energy consumption for a device; and
    setting the output voltage and frequency of the device to values defining the selected separate point.

15. The medium of claim 14, wherein the voltage regulator has a non-monotonic efficiency response.

16. The medium of claim 14, wherein the operation of determining the separate point of minimum energy consumption comprises incrementally reducing the output voltage of the voltage regulator and recalculating energy consumption after each reduction until the point of minimum energy consumption is found.

17. The medium of claim 14, wherein the operation of determining the separate point of minimum energy consumption comprises incrementally increasing the output voltage of the voltage regulator and recalculating energy consumption after each increase until the point of minimum energy consumption is found.

18. The medium of claim 14, wherein the operation of selecting one of the separate points as the point of minimum energy consumption comprises selecting a point of minimum energy consumption having a smallest value among all the modes.

19. The medium of claim 14, wherein each separate point of minimum energy consumption is to be calculated as Eop=input voltage to the VR*average current into the VR over multiple operations*a defined time period.

* * * * *